US008323399B2

(12) United States Patent
Guynn et al.

(10) Patent No.: US 8,323,399 B2
(45) Date of Patent: *Dec. 4, 2012

(54) HIGH EARLY STRENGTH POZZOLAN CEMENT BLENDS

(75) Inventors: John M. Guynn, Salt Lake City, UT (US); Andrew S. Hansen, Bountiful, UT (US)

(73) Assignee: Roman Cement, LLC, Bountiful, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,636

(22) Filed: Jul. 1, 2011

(65) Prior Publication Data

US 2011/0259246 A1  Oct. 27, 2011

Related U.S. Application Data

(63) Continuation of application No. 12/848,945, filed on Aug. 2, 2010, now Pat. No. 7,972,432, which is a continuation of application No. 12/576,117, filed on Oct. 8, 2009, now Pat. No. 7,799,128.

(60) Provisional application No. 61/104,661, filed on Oct. 10, 2008.

(51) Int. Cl.
*C04B 18/06* (2006.01)

(52) U.S. Cl. .................. 106/705; 106/713; 106/789

(58) Field of Classification Search ................ 106/705, 106/713, 789
See application file for complete search history.

(56) References Cited

U.S. PATENT DOCUMENTS

| 4,160,674 A | 7/1979 | Sawyer |
| 4,509,985 A | 4/1985 | Davidovits et al. |
| 4,640,715 A | 2/1987 | Heitzmann et al. |
| 4,642,137 A | 2/1987 | Heitzmann et al. |
| 4,842,649 A | 6/1989 | Heitzmann et al. |

(Continued)

FOREIGN PATENT DOCUMENTS

CA        2085219        10/2004

(Continued)

OTHER PUBLICATIONS

"Improved Cement Quality and Grinding Efficiency by Means of Closed Mill Circuit Modeling," A Dissertation by Gleb Gennadievich Mejeoumov, Submitted to the Office of Graduate Studies of Texas A&M University in partial fulfillment of the requirements for the degree of Doctor of Philosophy, Dec. 2007.

(Continued)

*Primary Examiner* — Paul Marcantoni
(74) *Attorney, Agent, or Firm* — Workman Nydegger

(57) ABSTRACT

A high early strength blended cement composition includes larger sized fly ash and/or natural pozzolan particles blended with smaller sized hydraulic cement particles containing tricalcium silicate and/or dicalcium silicate (e.g., Portland cement and/or ground granulated blast furnace slag). Excess calcium released from the hydraulic cement particles when mixed with water forms calcium hydroxide available for reaction with the fly ash and/or natural pozzolan. The fineness of the hydraulic cement particles is substantially greater than the fineness of the fly ash and/or natural pozzolan particles (e.g., about 1.25 to about 50 times greater). Reducing or eliminating coarse hydraulic cement particles that cannot fully hydrate but include unreacted cores reduces or eliminates wasted cement normally found in concrete. Replacing some or all of the coarse cement particles with coarse pozzolan particles provides a blended cement composition having significantly lower water demand compared to the hydraulic cement fraction by itself.

20 Claims, 2 Drawing Sheets

U.S. PATENT DOCUMENTS

| | | | |
|---|---|---|---|
| 4,997,484 | A | 3/1991 | Gravitt et al. |
| 5,375,776 | A | 12/1994 | Kupper et al. |
| 5,417,760 | A | 5/1995 | Folsberg |
| 5,525,155 | A | 6/1996 | Allen |
| 5,531,823 | A | 7/1996 | Breton |
| 5,650,004 | A | 7/1997 | Yon |
| 5,651,505 | A | 7/1997 | Lidstrom |
| 5,718,759 | A | 2/1998 | Stav et al. |
| 5,804,175 | A | 9/1998 | Ronin et al. |
| 5,951,279 | A | 9/1999 | Hunold et al. |
| 6,027,561 | A | 2/2000 | Gruber et al. |
| 6,030,447 | A | 2/2000 | Naji et al. |
| 6,444,026 | B1 | 9/2002 | Steffler et al. |
| 6,641,658 | B1 | 11/2003 | Dubey |
| 6,691,628 | B2 | 2/2004 | Meyer et al. |
| 6,695,911 | B2 | 2/2004 | Ramesohl et al. |
| 7,240,867 | B2 | 7/2007 | Ronin |
| 7,296,994 | B2 | 11/2007 | Meyer et al. |
| 7,347,896 | B2 | 3/2008 | Harrison |
| 7,419,544 | B2 | 9/2008 | Naji et al. |
| 7,442,248 | B2 | 10/2008 | Timmons |
| 7,445,668 | B2 | 11/2008 | Sommain |
| 7,799,128 | B2 * | 9/2010 | Guynn et al. .......... 106/705 |
| 7,972,432 | B2 * | 7/2011 | Guynn et al. .......... 106/705 |
| 2001/0013302 | A1 | 8/2001 | Mathur et al. |
| 2001/0020654 | A1 | 9/2001 | Strasser et al. |
| 2003/0056935 | A1 | 3/2003 | Meyer et al. |
| 2004/0089203 | A1 | 5/2004 | Ronin |
| 2005/0000393 | A1 | 1/2005 | Virtanen |
| 2005/0204962 | A1 | 9/2005 | Luke et al. |
| 2007/0095255 | A1 | 5/2007 | Abbate et al. |
| 2007/0266906 | A1 | 11/2007 | Garcia |
| 2009/0020044 | A1 | 1/2009 | Constantz et al. |
| 2009/0121052 | A1 | 5/2009 | Ronin et al. |
| 2009/0305019 | A1 | 12/2009 | Chanvillard et al. |
| 2010/0043673 | A1 | 2/2010 | Batoz et al. |
| 2010/0294171 | A1 | 11/2010 | Schwartzentruber et al. |
| 2010/0326326 | A1 | 12/2010 | Rigaud et al. |
| 2012/0024198 | A1 | 2/2012 | Schwartzentruber et al. |
| 2012/0037045 | A1 | 2/2012 | Fonollosa et al. |

FOREIGN PATENT DOCUMENTS

| | | |
|---|---|---|
| EP | 0088587 | 9/1983 |
| EP | 0263723 | 4/1988 |
| EP | 0611081 | 8/1994 |
| JP | 2002/068806 | 3/2002 |
| KR | 10-0183536 | 5/1999 |
| WO | WO 01/23317 | 4/2001 |

OTHER PUBLICATIONS

"The Cement Sustainability Initiative—Climate Actions", World Business Council for Sustainable Development ("WBCSD"), Nov. 2008.

Durán-Herrera et al., "Synergetic effect of a Polycarboxylate Superplasticizer and a Fly Ash in the Production of a Concrete with conventional water/binder ratios"; Ninth ACI International Conference on Superplasticizers and Other Chemical Admixture Program, American Concrete Institute, Oct. 12, 2009.

Bentz, D., "Calorimetric Studies of Powder Additions to Mitigate Excessive Retardation in High Volume Fly Ash Mixtures", ACI Materials Journal pp. 1-20, Sep. 9, 2009.

Yilmaz, A., "Relationship Between Compressive and Chemical Compositions of Portland and Pozzolanic Cements", BAÜ Fen Bil. Enst. Dergisi, 5.2, pp. 4-13, 2003.

"Engineering news, opinion and product reports for engineers in process, design, electronics, energy and chemical engineering", Particle Size Analysis Reduces Cement Manufacturing Costs—Engineer Live, for Engine . . . http://www.engineerlive.com/Process-Engineer/Materials_Handling/Particle size analysis..., pp. 1-7, Oct. 26, 2009.

"Florida Rock slashes production costs using advanced process control and real-time particle size analysis", Real-time Particle Size Analysis—Forums, http://www.bulk-online.com/Forum/showthread.php?threadid=18052, (At least as early as Oct. 25, 2009).

Uzal et al., "High Volume Natural Pozzolan Concrete for Structural Applications", Business Publications, ACI Materials Journal, Sep./Oct. 2007.

Mehta, K., "High-Performance, High-Volume Fly Ash Concrete for Sustainable Development," Proceedings of the International Workshop on Sustainable Development & Concrete Technology, pp. 3-14; May 2004.

Thomas et al., "Use of ternary cementitious systems containing silica fume and fly ash concrete," Elsevier Science Ltd. Sep. 21, 1999.

"Cement Substitutes, By-Products from other manufacturing or electric generating processes can be substituted for cement", Toolbase Services, NAHB Research Center (At least as early as Jul. 14, 2009).

Bentz, D., "Replacement of "coarse" cement particles by inert fillers in low w/c ratio concretes II. Experimental validation", Cement and Concrete Research 35, pp. 185-188, Sep. 3, 2004.

Bentz, D., "Computer modeling of the replacement of 'coarse' cement particles by inert fillers in low w/c ratio concretes Hydration and strength", Cement and Concrete Research 31, pp. 503-506, Jan. 5, 2001.

Bentz et al., "Effects of cement particle size distribution on performance properties of Portland cement-based materials", Cement and Concrete Research 29, pp. 1663-1671, Jul. 14, 1999.

"Understanding Cement, Cement science made easier, Variability of cement", http://www.understanding-cement.com/variability.html, Jan. 10, 2009.

"Roman Concrete", Wikipedia, http://en.wikipedia.org/wiki/Roman_cement, Jan. 10, 2009.

Moore, D., "The Riddle of Ancient Roman Concrete", www.romanconcrete.com/docs/spillway/'spillway.htm., Feb. 1993.

"Cement", Wikipedia, http://en.wikipedia.org/wiki/Hydraulic_cement, Sep. 5, 2008.

Middendorf et al., "Lime Pozzolan Binders: An Alternative to OPC?", International Building Lime Symposium 2005, Orlando, Florida, pp. 1-13, Mar. 9-11, 2005.

Pure Natural Pozzolan Cement, Azmar International, Inc., pp. 1-11 (at least as early as Jul. 2008).

"Fly ash", Wikipedia, http://en.wikipedia.org/wiki/Fly_ash, Sep. 5, 2008.

"Cement Types," Ceratech, www.ceratechinc.com/cement.asp, Sep. 5, 2008.

"Pozzolan," Wikipedia, http://en.wikipedia.org/wiki/Pozzolan, Jan. 10, 2009.

"Pozzolete, a natural resource," Natural Pozzolan of Nevada, http://www.naturalpozzolan.com/pozzolete/index.html, Dec. 17, 2008.

"About Pozzolans, Pozzolans General Description," Vitro Minerals, http://www.vitrominerals.com/printable%20pages/tech-infor.htm, Dec. 17, 2008.

"CT-Microcem Ultra Fine Cement", Finland CT (at least as early as Jan. 2009).

Barger, GS, "Production and Use of Calcined Natural Pozzolans in Concrete," Journal of Cement, Concrete and Aggregates, vol. 23, Issue 2, Dec. 2001.

"Fly Ash," U.S. Department of Transportation, Infrastructure Materials Group, http://fhwa.dot.gov/infrastructure/materialsgrp/flyash.htm, Jan. 10, 2009.

Gibbons, P., Pozzolans for Lime Mortars, The Building Conservation Directory 1997, http://www.buildingconvservation.com/articles/lime/pozzo.htm, pp. 1-5, Sep. 5, 2008.

Osbaeck, B. and Johansen, V., "Particle Size Distribution and Rate of Strength Development of Portland Cement," J. Am. Ceram. Soc., 72 (2) pp. 197-201, Feb. 1989.

Horst, Scot, "Some Basics About Substituting Pozzolans for Portland Cement in Concrete," as taken from presentation handout with author's permission, USGBC Member Summit, Tucson, AZ, pp. 1-7, Aug. 2001.

"Blender dedusts fly ash with minimal moisture to cut transport costs," Case History, Powder and Bulk Engineering, www.powderbulk.com, Jul. 2001.

Shah, Surendra P. and Wang, Kejin, "Development of "Green" Cement for Sustainable Concrete Using Cement Kiln Dust and Fly Ash," Dept. of Civil Engineering, Northwestern University, Evanston, IL USA and Dept. of Civil Engineering Iowa State University, Ames IA USA, pp. 15-23 (at least as early as Feb. 2009).

Technical Evaluation of Energetically Modified Cement, ISG Resources Inc., pp. 1-4, Aug. 2001.

Bentz, Dale, "Considerations of Designing High Volume Fly Ash Mixtures," ACI 2009 Spring Convention, Research in Progress, Powerpoint Presentation, pp. 1-5, presented Mar. 16, 2009.

Malvern, "Inform-Reducing the Cost of Cement Production Benefits to Vulcan Materials Decision to Upgrade its Finishing Circuit from Manual to Automated Process Monitoring and Control," World Cement, Jul. 2009.

Basalite Concrete Products, "Microcem-Microfine Cement," (at least as early as Jun. 2006).

Andersen, P., "Control and Monitoring of Concrete Production . . . a Study of Particle Packing and Rheology", The Danish Academy of Technical Sciences, 1990.

Durán-Herrera et al., "Evaluation of Sustainable High-Volume Fly-Ash Concretes", National Institute of Standards and Technology, (2009).

Bentz, D., "Limestone Fillers Conserve Cement, Part 1: An analysis based on Powders' model", Concrete International, pp. 41-46, Nov. 2009.

Bentz et al., "Mixture Proportioning Options for Improving High Volume Fly Ash Concretes", at least as early as Feb. 19, 2010 at http://concrete.nist.gov/bentz.

International Search Report and Opinion dated May 6, 2010 from PCT Application Serial No. PCT/US2009/060194.

International Preliminary Report on Patentability dated Apr. 21, 2011 from PCT Application Serial No. PCT/US2009/060194.

Cross et al., "Evaluation of the Durability of 100 Percent Fly Ash Concrete," Western Transportation Institute, Final Report Nov. 2006 through Jun. 2008, 45 pages.

Hwang et al., "Rheological behavior of a slag cement paste prepared by adjusting the particle size distribution", Journal of Ceramic Processing Research, vol. 10, No. 4, pp. 409-413, (2009).

Zhang et al., A new gap-graded particle size distribution and resulting consequences on properties of blended cement (Accepted Manuscript) (Accepted Date: Feb. 24, 2011).

OK Vertical Roller Miller, Product brochure published by FLSmidth (2010).

Wang et al., The Application and Development of Fly Ash in China, 2007 World of Coal Ash (WOCA), May 7-10, 2007, Northern Kentucky, USA.

Harbour et al., Characterization of Slag, Fly Ash and Portland Cement for Saltstone (Feb. 2006).

Gurney et al., Using Limestone to Reduce Set Retardation in High Volume Fly Ash Mixtures: Improving Constructability for Sustainability, National Institute of Standards and Technology (Submission Date: Aug. 1, 2011).

Van Oss, Background Facts and Issues Concerning Cement and Cement Data, USGS (2005).

U.S. Appl. No. 12/576,117, filed Oct. 8, 2009, Notice of Allowance dated Jul. 22, 2010.

U.S. Appl. No. 12/848,945, filed Aug. 2, 2010, Office Action mailed Oct. 15, 2010.

U.S. Appl. No. 12/848,945, filed Aug. 2, 2010, Office Action mailed Dec. 28, 2010.

U.S. Appl. No. 12/848,945, filed Aug. 2, 2010, Notice of Allowance dated Mar. 3, 2011.

U.S. Appl. No. 13/183,205, filed Jul. 14, 2011, Non-Final Office Action dated May 3, 2012.

U.S. Appl. No. 13/315,089, filed Dec. 8, 2011, Non-Final Office Action dated May 3, 2012.

* cited by examiner

HIGH EARLY STRENGTH POZZOLAN CEMENT BLENDS

CROSS REFERENCE TO RELATED APPLICATION

This application is a continuation of co-pending U.S. patent application Ser. No. 12/848,945, filed Aug. 2, 2010, which is a continuation of co-pending U.S. patent application Ser. No. 12/576,117, filed Oct. 8, 2009, which claims the benefit of U.S. Provisional Application No. 61/104,661, filed Oct. 10, 2008. The disclosures of the foregoing applications are incorporated herein in their entirety.

BACKGROUND OF THE INVENTION

1. Field of the Invention

The invention is generally in the field of hydraulic cement used in the manufacture of concrete, more particularly to hydraulic cements that include pozzolans.

2. Relevant Technology

"Roman cement" was used by the Romans to build spectacular buildings and aqueducts that still stand after 2000 years. Roman cement was formed by mixing a pozzolan (e.g., volcanic ash or ground brick) with lime and water to form a lime-pozzolan cement. The hydration products of Roman cement are essentially the same as in modern Portland cement but they form much more slowly, making Roman cement impractical as a modern cementing material.

In modern concrete, pozzolans such as fly ash and volcanic ash are often used to replace a portion of Portland cement. Replacing a portion of Portland cement with pozzolan yields improved concrete with higher durability, lower chloride permeability, reduced creep, increased resistance to chemical attack, lower cost and reduced environmental impact. Pozzolans react with excess calcium hydroxide released during hydration of Portland cement and therefore help prevent carbonation. However, there is a limit to how much Portland cement can be replaced with pozzolan because pozzolans generally retard strength development.

Notwithstanding the potential economic and environmental benefits that would derive from increasing the pozzolan content and reducing the Portland cement content when manufacturing concrete, technical limits have limited their practical use to current levels. It is estimated that less than 40% of ready mix concrete in the United States uses any pozzolan at all and of those that do use pozzolans, the typical replacement level is about 10%-15%. While highly engineered concretes can include more pozzolan as a percentage of total binder, engineering concrete to overcome the deficiencies of blended cements comes at a high cost that is usually only justified in expensive building projects such as high rise buildings and large public works structures where the beneficial properties of the pozzolan outweigh the engineering costs. In most cases, the tendency of pozzolans to retard concrete strength development creates an upper replacement limit beyond which the advantages of Portland cement replacement disappear. In short, when cost and ease of manufacture are the chief concerns, such as in the case of general purpose concretes, pozzolans are typically used in low amounts or not all.

BRIEF SUMMARY OF THE INVENTION

The present invention relates to pozzolan cement blends that are particle size optimized to increase the level of pozzolan replacement of Portland cement while maintaining high early strength development. By increasing pozzolan replacement levels without significantly reducing early strength development, the inventive pozzolan cement blends more fully realize the economic and environmental benefits of pozzolan replacement compared to existing cements and concretes.

According to one embodiment, pozzolan cement blends are provided that can be readily substituted for ordinary Portland cement (OPC) (e.g., Type I and II cements). The inventive pozzolan cement blends avoid the strength retarding effects of pozzolan by maintaining the same or similar concentration of highly reactive fine Portland cement particles (e.g., a distribution of about 0.1-10 µm) found in ordinary Portland cement (OPC). The coarse Portland cement particles are replaced with a similar quantity of coarse pozzolan particles having the same or similar particle size distribution and/or fineness. The coarse pozzolan particles help disperse and moderate the reaction of the fine Portland cement particles, reduce water demand, and provide long-term strength development in much the same way as the coarse Portland cement particles contained in OPC.

Both OPC and fly ash typically have a particle size distribution ranging from about 0.1-45 µm, with about half the volume consisting of "fine" particles below about 10-15 µm and half consisting of "coarse" particles larger than about 10-15 µm. An optimized blend of Portland cement and fly ash or other pozzolan can be provided by (1) removing the coarse particles from Portland cement and keeping mainly or exclusively the fine particles, (2) removing some or all of the fine particles from the pozzolan and keeping the coarse particles, and (3) blending the fine Portland cement and coarse pozzolan particles together. The result is a new pozzolan cement blend that provides the same or similar early strength development in concrete as OPC. And it costs substantially less than OPC.

According to one embodiment, there can be a cutoff particle size separating the Portland cement and pozzolan particles (e.g., ranging from about 5-30 µm). In this embodiment, most or all of the Portland cement particles will be at or below the cutoff size (e.g. less than about 20 µm, 15 µm, 10 µm, 7.5 µm, or 5 µm), and most or all of the pozzolan particles will be at or above the cutoff size (e.g., greater than about 5 µm, 7.5 µm, 10 µm, 15 µm, or 20 µm). In some cases, the level of pozzolan replacement of Portland cement can be adjusted by changing the particle size cutoff. Raising the particle size cutoff generally decreases the level of pozzolan replacement and lowering the cutoff increases the level of pozzolan replacement. In some embodiments, there can be significant overlap between the Portland cement and pozzolan particle sizes so long as the overall fineness of the Portland cement fraction substantially exceeds the fineness of the pozzolan fraction. A relatively small quantity of fine pozzolan particles may be included to help disperse the fine Portland cement particles.

In contrast to existing methods for increasing the reactivity and early strength development of pozzolan cement blends, which generally involve the use of finer pozzolans, whether by grinding or selection, the pozzolanic cements disclosed herein are made using the counterintuitive approach of maintaining a relatively coarse pozzolan fraction or even decreasing the fineness of the pozzolan fraction. In general, the invention provides high early strength pozzolan cement by shifting the balance of particle size distribution in the cement composition toward predominantly larger-sized pozzolan particles and smaller-sized hydraulic cement particles. In this way, the hydraulic cement and pozzolan fractions are put to their highest respective uses.

It has been found that it is primarily the smaller cement particles that provide early strength development of OPC. Due to slow and limited penetration of water into cement grains during hydration, only the very small Portland cement particles (e.g., 0.1-5 µm) are fully hydrated in the first 28 days. Larger particles are only partially hydrated at the surface. Portland cement particles larger than 10-20 µm can take years to fully hydrate. The use of larger-sized Portland cement particles is wasteful because the unreacted inner volumes of such particles act as expensive fillers during the relevant strength development period. Nevertheless, the inclusion of larger sized Portland cement particles in OPC is necessary to regulate set time, provide desired water demand and rheology, and contribute to long term strength. Very finely ground Portland cement falls within Type III rapid hardening cement, which develops higher early strength but lower long-term strength than Types I and II cement.

In order to maintain a similar strength development profile as OPC and maintain similar water demand and rheology, most or all of the larger sized hydraulic (e.g., Portland) cement particles can be replaced with similarly sized pozzolan particles. In the short term, the slow reacting pozzolan particles behave similarly to the larger sized hydraulic cement particles they replace. They react enough and are sufficiently chemically compatible with the small, hydrating cement particles that high early strength is maintained. However, unlike unreactive fillers, such as ground inert stone or sand, pozzolans continue to react and contribute to the growth of cement paste and concrete strength over time. Because pozzolan cements can, in the long term, develop strengths that equal or exceed that of OPC, the long term strength of the inventive pozzolan cements can also equal or exceed that of OPC.

The ability to replace moderate to high levels of the Portland cement with a pozzolan and maintain similar strength and performance characteristics as OPC is a surprising and unexpected result made possible by keeping the particle size distribution of the overall pozzolan cement blend similar to OPC while using smaller Portland cement particles. As compared to a traditional blend of OPC and pozzolan, the pozzolan cement blends have a higher percentage of small Portland cement particles that fully hydrate in 28 days, thereby unleashing all of the potential of the Portland cement in the desired time frame. This increased utilization of the Portland cement is one principle reason that the pozzolan cement blends described herein can achieve similar performance characteristics as OPC with high volumes of pozzolan.

The finer Portland cement particles also benefit the coarse pozzolan fraction. The fully hydrated fine Portland cement particles release additional lime, which accelerates the pozzolanic reaction and produces increased long term strength. Thus, the combination of fine cement particles and coarse pozzolan particles creates a synergy that cannot be achieved by blending the full range particle distributions of pozzolans and Portland cement as is currently practiced.

Another significant benefit of particle size optimized pozzolan cement blends is the reduction in carbon dioxide emissions. It is estimated that Portland cement contributes 5% or more of man-made carbon dioxide. The wasted cement in the core of unhydrated cement particles represents a wasted environmental cost that is mitigated in the pozzolan cement blends described herein. This reduction in the use of cement represents a true reduction in carbon emissions because it comes at no loss to the performance of the cement.

In some cases it may be desirable supplement the amount of excess calcium hydroxide provided by the hydraulic cement by adding calcium oxide or calcium hydroxide. Lye or other strong bases can also be added to accelerate the lime-pozzolan reaction. Alternatively, the relative amount of calcium in the hydraulic cement fraction can be increased by increasing the ratio of tricalcium silicate to dicalcium silicate in the cement clinker.

In short, by properly balancing the relative quantities and particle size distributions of the larger pozzolan particles and smaller hydraulic cement particles, the present invention provides pozzolan cement compositions that can have the same or better early and ultimate strength compared to OPC, while exhibiting similar or superior flow properties, durability, reduced permeability and resistance to chemical attack. And it can do so at lower cost, reduced $CO_2$ emissions, and while reducing or eliminating the use of expensive admixtures compared to current schemes that overload or replace OPC with finely ground pozzolans to provide higher early strength and long term strength and durability.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
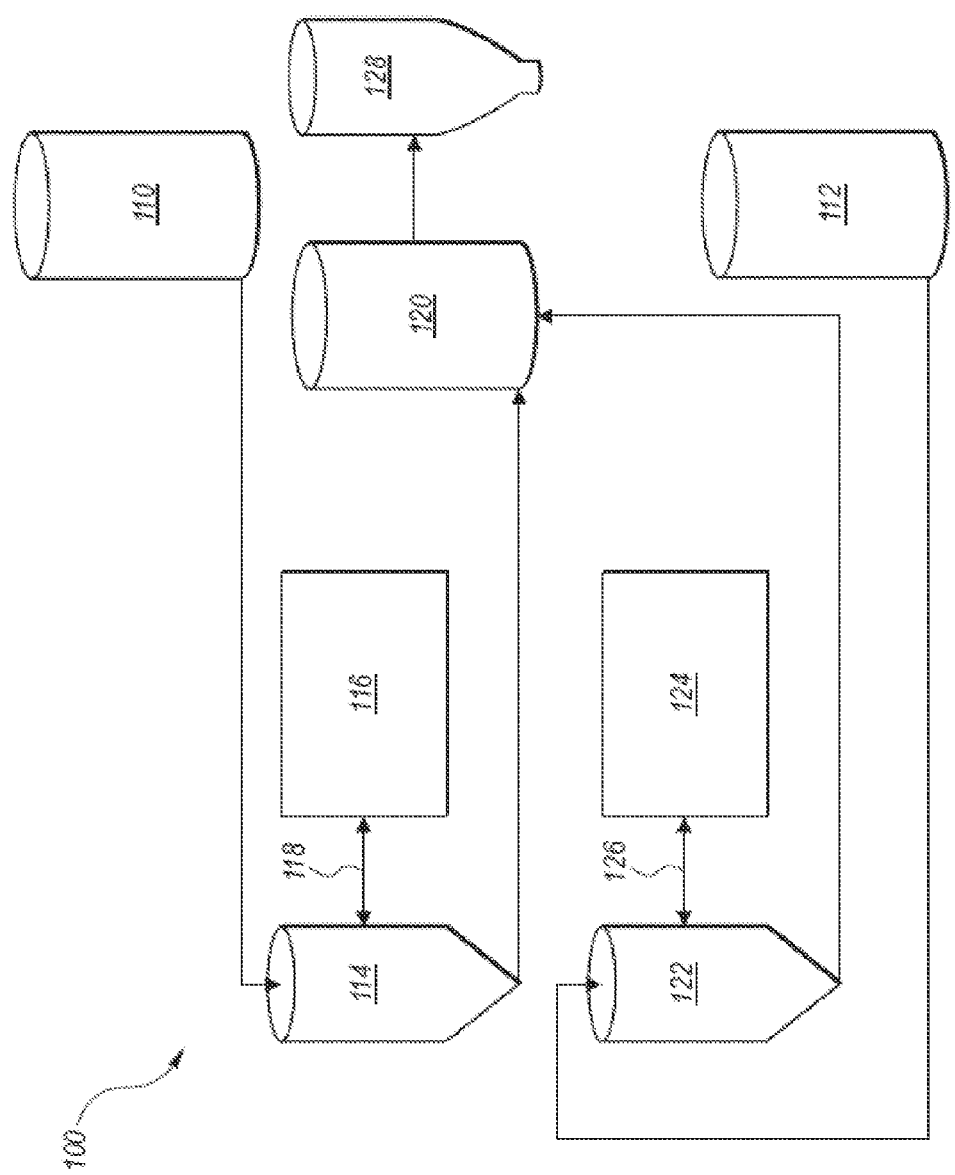
FIG. 1 is a schematic of a system for producing a pozzolan cement blend.

Disclosed herein is a high early strength pozzolan cement that can take the place of ordinary Portland cement (e.g., Type I and II cements) used in both common and high end construction. The inventive pozzolan cements include a unique distribution of pozzolan and hydraulic cement particles in which the larger sized particles comprise mostly or exclusively pozzolan and the smaller sized particles comprise mostly or exclusively hydraulic cement. The calcium hydroxide required to effect hydration of the pozzolan is provided by excess calcium from the hydraulic cement fraction. The result is a cement composition that provides high early strength similar to OPC with superior long-term strength and durability, and lower cost and $CO_2$ output.

Rather than wasting Portland cement in the form of large particles that only react on the surface and which mainly act as expensive fillers, the invention unlocks much more of the binding ability of the hydraulic cement by utilizing finer, more reactive particles that become substantially or fully hydrated in the short term (e.g., 7 days, 28 days or 45 days). Rapid hardening of the finer hydraulic cement particles is controlled and water demand is reduced by utilizing larger pozzolan particles that help disperse the hydraulic cement particles. In this way, the hydraulic cement and pozzolan fractions are put their highest respective uses.

According to one embodiment, a high early strength pozzolan cement can be made which has a Blaine fineness and particle size distribution (e.g., as described by the Rosin-Rammler-Sperling-Bennet distribution) that approximates that of OPC. In this way, the cement composition can behave similar to OPC in terms of water demand, rheology and strength development.

Except as otherwise specified, percentages are to be understood in terms of weight percent. It will be appreciated, however, that where there is a significant disparity between the density of the hydraulic cement and that of the pozzolan, adjustments can be made so that an equivalent volume of pozzolan is added in place of a similar volume of hydraulic cement being replaced. For example, the correct weight of pozzolan replacement may be determined by multiplying the weight of cement reduction by the ratio of the pozzolan density to the cement density.

II. Cement Compositions

A. Particle Size Distributions

The particle size of perfectly spherical particles is measured by the diameter. While fly ash is generally spherical owing to how it is formed, Portland cement and pozzolan particles may be non spherical. Thus, the "particle size" shall be determined according to accepted methods for determining the particle size of ground or other otherwise non spherical materials, such as Portland cement and many pozzolans. The size of particles in a sample can be measured by visual estimation or by the use of a set of sieves. Particle size can be measured individually by optical or electron microscope analysis. The particle size distribution (PSD) can also be determined or estimated by laser or x-ray diffraction (XRD).

The pozzolan cement compositions (i.e., blended cements) according to the invention typically include a distribution of particles spread across a wide range of particle sizes (e.g., over a range of about 0.1-120 μm, or about 0.1-100 μm, or about 0.1-80 μm, or about 0.1-60 μm, or about 0.1-45 μm). According to one embodiment, at least 50% of the combined pozzolan and hydraulic cement particles larger than about 20 μm (e.g., distributed over a range of about 20-100 μm, or about 20-60 μm) comprise pozzolan and less than 50% comprise hydraulic cement. Preferably, at least about 65% of the particles larger than about 20 μm comprise pozzolan and less than about 35% comprise hydraulic cement. More preferably, at least about 75% of the particles larger than about 20 μm comprise pozzolan and less than about 25% comprise hydraulic cement. Even more preferably, at least about 85% of the particles larger than about 20 μm comprise pozzolan and less than about 15% comprise hydraulic cement. Most preferably, at least about 95% of the particles larger than about 20 μm comprise pozzolan and less than about 5% comprise hydraulic cement. In some cases it may be desirable for essentially all of the particles larger than about 20 μm to comprise pozzolan and none to comprise hydraulic cement.

In another embodiment, at least 50% of the combined pozzolan and hydraulic cement particles larger than about 15 μm (e.g., distributed over a range of about 15-100 μm, or about 15-60 μm) comprise pozzolan and less than 50% comprise hydraulic cement. Preferably, at least about 65% of the particles larger than about 15 μm comprise pozzolan and less than about 35% comprise hydraulic cement. More preferably, at least about 75% of the particles larger than about 15 μm to comprise pozzolan and less than about 25% comprise hydraulic cement. Even more preferably, at least about 85% of the particles larger than about 15 μm comprise pozzolan and less than about 15% comprise hydraulic cement. Most preferably, at least about 95% of the particles larger than about 15 μm comprise pozzolan and less than about 5% comprise hydraulic cement. In some cases it may be desirable for essentially all of the particles larger than about 15 μm to comprise pozzolan and none to comprise hydraulic cement.

In still another embodiment, at least 50% of the combined pozzolan and hydraulic cement particles larger than about 10 μm (e.g., distributed over a range of about 10-100 μm, or about 10-60 μm) comprise pozzolan and less than 50% comprise hydraulic cement. Preferably, at least about 65% of the particles larger than about 10 μm comprise pozzolan and less than about 35% comprise hydraulic cement. More preferably, at least about 75% of the particles larger than about 10 μm comprise pozzolan and less than about 25% comprise hydraulic cement. Even more preferably, at least about 85% of the particles larger than about 10 μm comprise pozzolan and less than about 15% comprise hydraulic cement. Most preferably, at least about 95% of the particles larger than about 10 μm comprise pozzolan and less than about 5% comprise hydraulic cement. In some cases it may be desirable for essentially all of the particles larger than about 10 μm to comprise pozzolan and none to comprise hydraulic cement.

In still another embodiment, at least 50% of the combined pozzolan and hydraulic cement particles larger than about 7.5 μm (e.g., distributed over a range of about 7.5-100 μm) comprise pozzolan and less than 50% comprise hydraulic cement. Preferably, at least about 65% of the particles larger than about 7.5 μm comprise pozzolan and less than about 35% comprise hydraulic cement. More preferably, at least about 75% of the particles larger than about 7.5 μm comprise pozzolan and less than about 25% comprise hydraulic cement. Even more preferably, at least about 85% of the particles larger than about 7.5 μm comprise pozzolan and less than about 15% comprise hydraulic cement. Most preferably, at least about 95% of the particles larger than about 7.5 μm comprise pozzolan and less than about 5% comprise hydraulic cement. In some cases it may be desirable for essentially all of the particles larger than about 7.5 μm to comprise pozzolan and none to comprise hydraulic cement.

Finally, it may even be desirable in some cases that at least 50% of the combined pozzolan and hydraulic cement particles larger than about 5 μm (e.g., distributed over a range of about 5-100 μm, or about 5-60 μm) comprise pozzolan and less than 50% comprise hydraulic cement. Preferably, at least about 65% of the particles larger than about 5 μm comprise pozzolan and less than about 35% comprise hydraulic cement. More preferably, at least about 75% of the particles larger than about 5 μm comprise pozzolan and less than about 25% comprise hydraulic cement. Even more preferably, at least about 85% of the particles larger than about 5 μm comprise pozzolan and less than about 15% comprise hydraulic cement. Most preferably, at least about 95% of the particles larger than about 5 μm comprise pozzolan and less than about 5% comprise hydraulic cement. In some cases it may be desirable for essentially all of the particles larger than about 5 μm to comprise pozzolan and none to comprise hydraulic cement.

According to one embodiment, at least about 75% of the combined pozzolan and hydraulic cement smaller than about 20 μm (e.g., distributed over the range from about 0.1-20 μm) comprise hydraulic cement and less than 25% comprise pozzolan. Preferably, at least about 80% of the particles smaller than about 20 μm comprise hydraulic cement and less than about 20% comprise pozzolan. More preferably, at least about 85% of the particles smaller than about 20 μm comprise hydraulic cement and less than about 15% comprise pozzolan. Even more preferably, at least about 90% of the particles smaller than about 20 μm comprise hydraulic cement and less than about 10% comprise pozzolan. Most preferably, at least about 95% of the particles smaller than about 20 μm comprise hydraulic cement and less than about 5% comprise pozzolan. In some cases it may be desirable for essentially all of the particles smaller than about 20 μm to comprise hydraulic cement and none to comprise pozzolan.

In another embodiment, at least about 75% of the combined pozzolan and hydraulic cement particles smaller than about 15 μm (e.g., distributed over the range from about 0.1-15 μm) comprise hydraulic cement and less than 25% comprise pozzolan. Preferably, at least about 80% of the particles smaller than about 15 μm comprise hydraulic cement and less than about 20% comprise pozzolan. More preferably, at least about 85% of the particles smaller than about 15 μm comprise hydraulic cement and less than about 15% comprise pozzolan. Even more preferably, at least about 90% of the particles smaller than about 15 μm comprise hydraulic cement and less than about 10% comprise pozzolan. Most preferably, at least about 95% of the particles smaller than about 15 μm comprise hydraulic cement and less than about 5% comprise pozzolan. In some cases it may be desirable for essentially all of the particles smaller than about 15 μm to comprise hydraulic cement and none to comprise pozzolan.

In still another embodiment, at least about 75% of the combined pozzolan and hydraulic cement particles smaller than about 10 μm (e.g., distributed over the range from about 0.1-10 μm) comprise hydraulic cement and less than 25% comprise pozzolan. Preferably, at least about 80% of the particles smaller than about 10 μm comprise hydraulic cement and less than about 20% comprise pozzolan. More preferably, at least about 85% of the particles smaller than about 10 μm comprise hydraulic cement and less than about 15% comprise pozzolan. Even more preferably, at least about 90% of the particles smaller than about 10 μm comprise hydraulic cement and less than about 10% comprise pozzolan. Most preferably, at least about 95% of the particles smaller than about 10 μm comprise hydraulic cement and less than about 5% comprise pozzolan. In some cases it may be desirable for essentially all of the particles smaller than about 10 μm to comprise hydraulic cement and none to comprise pozzolan.

In still another embodiment, at least about 75% of the combined pozzolan and hydraulic cement particles smaller than about 7.5 μm (e.g., distributed over the range from about 0.1-7.5 μm) comprise hydraulic cement and less than 25% comprise pozzolan. Preferably, at least about 80% of the particles smaller than about 7.5 μm comprise hydraulic cement and less than about 20% comprise pozzolan. More preferably, at least about 85% of the particles smaller than about 7.5 μm comprise hydraulic cement and less than about 15% comprise pozzolan. Even more preferably, at least about 90% of the particles smaller than about 7.5 μm comprise hydraulic cement and less than about 10% comprise pozzolan. Most preferably, at least about 95% of the particles smaller than about 7.5 μm comprise hydraulic cement and less than about 5% comprise pozzolan. In some cases it may be desirable for essentially all of the particles smaller than about 7.5 μm to comprise hydraulic cement and none to comprise pozzolan.

Finally, it may be desirable that at least about 75% of the combined pozzolan and hydraulic cement particles smaller than about 5 μm (e.g., distributed over the range from about 0.1-5 μm) comprise hydraulic cement and less than about 25% comprise pozzolan. Preferably, at least about 80% of the combined pozzolan and hydraulic cement particles smaller than about 5 μm comprise hydraulic cement and less than about 20% comprise pozzolan. More preferably, at least about 85% of the particles smaller than about 5 μm comprise hydraulic cement and less than about 15% comprise pozzolan. Even more preferably, at least about 90% of the particles smaller than about 5 μm comprise hydraulic cement and less than about 10% comprise pozzolan. Most preferably, at least about 95% of the particles smaller than about 5 μm comprise hydraulic cement and less than about 5% comprise pozzolan. In some cases it may be desirable for essentially all of the particles smaller than about 5 μm to comprise hydraulic cement and none to comprise pozzolan. Notwithstanding the foregoing, in order to maintain sufficient early strength and reduce or prevent surface carbonation, it may be desirable to use a small quantity (e.g., about 0.5-3%) of a finely divided pozzolan (e.g., silica fume, metakaoline or ground or classified fly ash) having a particle size less than about 5 μm.

In order to further increase short-term strength development (e.g., 1-3 days), it may be desirable in some cases to overload the pozzolan cement with a higher quantity of very small hydraulic cement particles (i.e., 0.1-2.5 μm) in order to offset the strength retarding effect of the pozzolan particles. Accordingly, at least about 50% by weight of the hydraulic cement particles can have a particle size less than 2.5 μm (i.e., $D_{50}$ is 2.5 μm). In another embodiment, at least about 60% by weight of the hydraulic cement particles can have a particle size less than 2.5 μm (i.e., $D_{60}$ is 2.5 μm). In still embodiment, at least about 70% by weight of the hydraulic cement particles can have a particle size less than 2.5 μm (i.e., $D_{70}$ is 2.5 μm). In yet another embodiment, at least about 80% by weight of the hydraulic cement particles can have a particle size less than 2.5 μm (i.e., $D_{80}$ is 2.5 μm). In some cases, the at least about 90% by weight of the hydraulic cement particles can have a particle size less than 2.5 μm (i.e., $D_{90}$ is 2.5 μm). In some cases, it may be possible for essentially all (at least about 99%) of the hydraulic cement particles to have a particle size of less than about 2.5 μm.

The determination as to which particle size is selected as the cutoff between larger particles that are predominantly pozzolan and smaller particles that are predominantly hydraulic cement depends on a number of factors. These include a desired reactivity, ratio of pozzolan to hydraulic cement, proportion of fine to coarse aggregates, use of admixtures, accelerants, retardants, hydration stabilizers, and fillers, and the like. In general, increasing the ratio of pozzolan to hydraulic cement can retard strength development while increasing the ratio of hydraulic cement to pozzolan tends to accelerate strength development. Supplemental lime or other sources of calcium can accelerate setting, as can increasing the relative quantity of very small hydraulic cement particles (e.g., less than about 10 μm, or less than about 5 μm) compared to large cement and/or pozzolan particles (i.e., smaller hydraulic cement particles hydrate more rapidly than larger particles). Lye and other strong bases can also accelerate strength development by accelerating the lime-pozzolan reaction (e.g., by increasing the rate by which silicate ions are leached from the pozzolan particles).

With respect to the relative proportions of pozzolan and hydraulic cement and particle size cutoff, according to one embodiment, a pozzolan cement composition is provided in which at least at least 50%, preferably at least about 65%, more preferably at least about 75%, even more preferably at least about 85%, and most preferably at least about 95% of the larger particles greater than about 20 μm comprise pozzolan and at least about 75%, preferably at least about 80%, more preferably at least about 85%, even more preferably at least about 90%, and most preferably at least about 95% of the smaller particles less than about 5 μm comprise hydraulic cement. According to other embodiments, the larger particles associated with the applicable pozzolan ranges may include particles greater than about 15 μm, greater than about 10 μm, greater than about 7.5 μm, or greater than about 5 μm. According to other embodiments, the smaller particles associated with the applicable hydraulic cement ranges may include particles less than about 7.5 μm, less than about 10 μm, less than about 15 μm, or less than about 20 μm.

In view of the foregoing, the pozzolan fraction will generally have an average particle size that exceeds the average particle size of the hydraulic (e.g., Portland) cement fraction. In general, the average particle size of the pozzolan fraction is in a range of about 1.25 times to about 50 times the average particle size of the hydraulic cement fraction, preferably from about 1.5 times to about 30 times, more preferably from about 1.75 times to about 20 times, and most preferably from about 2 times to about 15 times the average particle size of the hydraulic cement fraction.

Stated another way, the Blaine fineness of the hydraulic cement fraction may be about 1.25 times to about 50 times that of the pozzolan fraction, preferably 1.5 times to about 30 times, more preferably about 1.75 times to about 20 times, and most preferably about 2 times to about 15 times the Blaine fineness of the pozzolan fraction. For example, the Blaine fineness of the hydraulic cement fraction can be about 500 $m^2$/kg or greater, preferably about 650 $m^2$/kg or greater, and more preferably about 800 $m^2$/kg or greater, and the Blaine fineness of the pozzolan fraction can be about 325 $m^2$/kg or less, preferably about 300 $m^2$/kg or less, more preferably about 275 $m^2$/kg or less.

The reactivity of the hydraulic cement fraction can be selected or adjusted to counterbalance the reactivity of the pozzolan fraction (e.g., by reducing or increasing the average particle size or fineness to increase or reduce reactivity, increasing or decreasing the proportion of tricalcium silicate relative to dicalcium silicate to increase or decrease reactivity, increasing or reducing the quantity of supplemental lime, increasing or decreasing the quantity of gypsum, and the like). For example, where the pozzolan is slower reacting, it may be desirable to increase reactivity of the hydraulic cement fraction. Conversely, where the pozzolan is faster reacting, it may be desirable to decrease reactivity of the hydraulic cement fraction to maintain a desired overall reactivity. By adjusting the reactivity of the hydraulic cement fraction so as to best accommodate the reactivity of the available pozzolan, the present invention permits the manufacture of pozzolan cement having a desired level of reactivity and early strength development while using a wide variety of different available pozzolans.

In an embodiment of invention, a pozzolan cement composition is provided that includes at least about 30% pozzolan and less than about 70% hydraulic cement (e.g., 55-70% hydraulic cement by volume and 30-45% pozzolan by volume). In another embodiment, a pozzolan cement composition is provided that includes at least about 40% pozzolan and less than about 60% hydraulic cement. In another embodiment, a pozzolan cement composition is provided that includes at least about 45% pozzolan and less than about 55% hydraulic cement. In yet another embodiment, a pozzolan cement composition is provided that includes at least about 55% pozzolan and less than about 45% hydraulic cement. In still another embodiment, a pozzolan cement composition is provided that includes at least about 65% pozzolan and less than about 35% hydraulic cement. And in another embodiment, a pozzolan cement composition is provided that includes at least about 75% pozzolan and less than about 25% hydraulic cement.

While the ranges provided herein relative to the particle size distributions of pozzolan and hydraulic cement are expressed in terms of weight percent, in an alternative embodiment of the invention, these ranges can be expressed in volume percent. Converting weight percent to volume percent may require using ratios of the densities of the various materials. Moreover, to the extent a pozzolan contains a substantial quantity of calcium (e.g., CaO), it may be desirable to factor out the weight or volume of such calcium and consider it to be "supplemental lime".

In some cases, it may be desirable to include inert fillers in order to provide a pozzolan cement having setting properties similar to OPC. For example, in the case where a relative high quantity of very small hydraulic cement particles is used (e.g., $D_{50}$ less than 2.5 μm), the pozzolan cement may develop strength too quickly for some purposes. In other words, the strength-accelerating effect of the hydraulic cement fraction may outweigh the strength retarding effect of the pozzolan fraction and set or harden too quickly. Rather than simply decrease the ratio of hydraulic cement to pozzolan, it may be desirable to add an inert filler in order to provide increased spacing between the hydraulic cement particles and thereby slow down the initial setting time. According to one embodiment, the inert filler may include coarser particles (e.g., 20-300 μm) in order to take up volume, increase separation of the hydraulic cement and/or pozzolan particles, and reduce water demand. According to another embodiment, the inert filler may include finer particles (e.g., less than about 20 μm). The inert filler may include inert fillers known in the art, examples of which include ground stone, rock and other geologic materials (e.g., ground granite, ground sand, ground bauxite, ground limestone, ground silica, ground alumina, and ground quartz).

B. Hydraulic Cement

"Portland cement" commonly refers to a ground particulate material that contains tricalcium silicate ("$C_3S$"), dicalcium silicate ("$C_2S$"), tricalcium aluminate ("$C_3A$") and tetra-calcium aluminoferrite "($C_4AF$") in specified quantities established by standards such as ASTM C-150 and EN 197. The term "hydraulic cement", as used herein, shall refer to Portland cement and related hydraulically settable materials that contain one or more of the four clinker materials (i.e., $C_2S$, $C_3S$, $C_3A$ and $C_4AF$), including cement compositions which have a high content of tricalcium silicate, cements that are chemically similar or analogous to ordinary Portland cement, and cements that fall within ASTM specification C-150-00.

In general, hydraulic cements are materials that, when mixed with water and allowed to set, are resistant to degradation by water. The cement can be a Portland cement, modified Portland cement, or masonry cement. "Portland cement", as used in the trade, means a hydraulic cement produced by pulverizing the large cement clinker particles (or nodules), comprising hydraulic calcium silicates, calcium aluminates, and calcium aluminoferrites, and usually containing one or more forms of calcium sulfate as an interground addition. Portland cements are classified in ASTM C-150 as Type III, III, IV, and V. Other hydraulically settable materials include ground granulated blast-furnace slag, hydraulic hydrated lime, white cement, calcium aluminate cement, silicate cement, phosphate cement, high-alumina cement, magnesium oxychloride cement, oil well cements (e.g., Type VI, VII and VIII), and combinations of these and other similar materials. In a preferred embodiment, the Portland cement has a chemical composition according to ASTM C-150 for Type I, II, or V cements, which tend to have beneficial properties for the ready mix industry.

Portland cement is typically manufactured by grinding cement clinker into fine powder. Various types of cement grinders are currently used to grind clinker. In a typical grinding process, the clinker is ground until a desired fineness is achieved. The cement is also typically classified to remove particles greater than about 45 μm in diameter, which are typically returned to the grinder for further grinding. Portland cements are typically ground to have a desired fineness and particle size distribution between 0.1-100 μm, preferably 0.1-45 μm. The generally accepted method for determining the "fineness" of a Portland cement powder is the "Blaine permeability test", which is performed by blowing air through an amount of cement powder and determining the air permeability of the cement. This gives an approximation of the total specific surface area of the cement particles and also a rough approximation of the particle size distribution, which is related to the specific surface area.

In contrast to OPC, the inventive pozzolan cement does not utilize a normal distribution of Portland cement particles but rather smaller particles as discussed above. All or a substantial portion of the larger hydraulic cement particles are "replaced" with similarly sized pozzolan particles (e.g., which have the same or similar particle size distribution and/or fineness as the hydraulic cement particles they replace and/or have an average particle size that significantly exceeds the average particle size of the hydraulic cement particles). Replacing larger hydraulic cement particles with pozzolan particles reduces cost, overall $CO_2$ output, and deleterious effects caused by including too much cement (e.g., creep, shrinkage, and decreased durability).

According to one embodiment, at least about 85% of the hydraulic cement particles will have a particle size less than about 20 μm (e.g., distributed over a range of about 0.1-20 μm), preferably at least about 90%, more preferably at least about 95%, and most preferably at least about 99%. Stated another way, the $D_{85}$, $D_{90}$, $D_{95}$ or $D_{99}$ of the hydraulic cement particles is about 20 μm or less in this embodiment. Similar restatements apply to the embodiments that follow. According to another embodiment, at least about 85% of the hydraulic cement particles will have a particle size less than about 15 μm (e.g., distributed over a range of about 0.1-15 μm), preferably at least about 90%, more preferably at least about 95%, and most preferably at least about 99%. According to yet another embodiment, at least about 85% of the hydraulic cement particles will have a particle size less than about 10 μm (e.g., distributed over a range of about 0.1-10 μm), preferably at least about 90%, more preferably at least about 95%, and most preferably at least about 99%. In still another embodiment, at least about 85% of the hydraulic cement particles will have a particle size less than about 7.5 μm (e.g., distributed over a range of about 0.1-7.5 μm), preferably at least about 90%, more preferably at least about 95%, and most preferably at least about 99%. And in another embodiment, at least about 85% of the hydraulic cement particles will have a particle size less than about 5 μm (e.g., distributed over a range of about 0.1-5 μm), preferably at least about 90%, more preferably at least about 95%, and most preferably at least about 99%.

C. Pozzolans

Pozzolans are usually defined as materials that contain constituents which will combine with free lime at ordinary temperatures in the presence of water to form stable insoluble compounds possessing cementing properties. Pozzolans can be divided into two groups, natural and artificial. Natural pozzolans are generally materials of volcanic origin, but include diatomaceous earths. Artificial pozzolans are mainly products obtained by heat treatment of natural materials such as clay and shale and certain siliceous rocks, and pulverized fuel ash (e.g., fly ash).

Pozzolans of volcanic origin consist of glassy incoherent materials or compacted tuffs arising from the deposition of volcanic dust and ash. They may occur in consolidated rock-like form underlying material deposited subsequently (e.g., Rhenish trass), or in a more fragmentary and unconsolidated state (e.g., Italian pozzolans). Examples of natural pozzolans include trass, perlite, Italian pozzolans, Santorin Earth, tosca, and tetin.

Rhenish trass is a trachytic (alkali feldspar) tuff which has been subjected to the action of $CO_2$-bearing waters for such a long time period that a large part of the minerals originally present has become hydrated and decomposed. It consists of an isotropic ground mass containing various crystalline mineral constituents such as feldspart, leucite and quartz, with small amounts of augite, hornblend, mica, and the like. The glassy matrix, amounting to about half of the trass, is the material that has undergone alternation and consists of zeolitic compounds among which are analcite and chabazite or herschellite.

Santorin earth consists mainly of a granular isotropic material mixed with pumice, obsidian and fragments of crystalline feldspar, pyroxenes and quartz, etc.

Natural volcanic pozzolans found in the United States are mostly tuffs, containing a rhyolitic glass with an index of refraction corresponding to a silica content of 70-76%. The glass content varies from about 50% to nearly 100%. The remaining constituents include quartz, feldspar, biotite, horneblende, hypersthene, sanidine, calcite and small amounts of opal, together with varying amounts of montmorillonite-type clays.

The chief artificial pozzolans are burnt clays and shales, spent oil shales, burnt gaize, burnt moler, pulverized fuel ash (e.g., fly ash), and ground slag. The product is ground to a desired fineness (conventionally to the same fineness as OPC).

Fly ash is a residue generated during combustion of coal. It is generally captured from the chimneys of coal-fired power plants, whereas bottom ash is removed from the bottom of the furnace. Depending upon the source and makeup of the coal being burned, the components of the fly ash produced vary considerably, but all fly ash includes substantial amounts of silicon dioxide ($SiO_2$) (both amorphous and crystalline) and widely varying amounts of calcium oxide (CaO). Bottom ash is generally less valuable than fly ash although it may be cleaned and ground to yield a useful pozzolan.

Fly ash material solidifies as glassy spheres or droplets while suspended in the exhaust gases and is collected by electrostatic precipitators or filter bags. Since the particles solidify while suspended in the exhaust gases, fly ash particles are generally spherical in shape and range in size from about 0.1-100 p.m. They consist mostly of silicon dioxide ($SiO_2$), which is present in two forms: amorphous, which is rounded and smooth, and crystalline, which is sharp, pointed and hazardous; aluminum oxide ($Al_2O_3$) and iron oxide ($Fe_2O_3$). Fly ashes are generally highly heterogeneous, consisting of a mixture of glassy particles with various identifiable crystalline phases such as quartz, mullite, and various iron oxides.

Two classes of fly ash are defined by ASTM C-618: Class F and Class C. The chief difference between these classes is the amount of calcium, silica, alumina, and iron content in the ash. Class F fly ash typically contains less than 10% lime (CaO); Class C fly ash generally contains more than 20% lime (CaO). The chemical properties of the fly ash are largely influenced by the chemical content of the coal burned (i.e., anthracite, bituminous, and lignite). Not all fly ashes meet ASTM C-618 requirements, although depending on the application, this may not be necessary. According to some standards, 75% of the fly ash must have a fineness of 45 μm or less, and have a carbon content, measured by the loss on ignition (LOI), of less than 4%. The particle size distribution of raw fly ash can fluctuate constantly due to changing performance of coal mills and boiler performance. Fly ash used in concrete is often processed using separation equipment such as mechanical air classifiers. In the presence of water, Class C fly ash will harden and gain strength over time. Unlike Class F, self-cementing Class C fly ash does not require an activator. Alkali and sulfate ($SO_4$) contents are generally higher in Class C fly ashes, which may make Class C fly ash less attractive than Class F fly ash for concrete that may be prone to alkali or sulfate attack.

Blast furnace slag is a by-product obtained in the manufacture of pig-iron in the blast furnace and is formed by the combination of the earthy constituents of the iron ore with the limestone flux. The composition of slag can vary over a wide range depending on the nature of the ore, the composition of the limestone flux, the coke consumption, and the kind of iron being made. These variations affect the relative contents of the four major constituents (lime, silica, alumina and magnesia) and also the minor components (sulfur in the form of sulfide, and ferrous and manganese oxides). In general, the lime content may range from 30-50%, silica 28-38%, alumina 8-24%, magnesia 1-18%, sulfur 1-2.5%, and ferrous and manganese oxides 1-3%, except in the special case of ferromanganese production when the manganese oxide content of the slag may be considerably higher.

Besides the foregoing examples, any geologic material, both natural and artificial, which exhibits pozzolanic activity, can be used to make the inventive pozzolanic cements. Diatomaceous earth, opaline, cherts, clays, shales, fly ash, silica fume, volcanic tuffs, pumices, and trasses are some of the known pozzolans. In order to reduce water demand and thereby improve strength while maintaining desired flow properties, pozzolans having more uniform surfaces (e.g., spherical or spheroidal) may be desirable. An example of a generally spherical pozzolan is fly ash, owning to how it is formed. Ground pozzolans generally have more jagged morphologies, which can increase water demand. Therefore, to the extent a process is able to yield a pozzolan having a more uniform surface, such a process would be desirable. In some cases, finer pozzolan particles can interact with and disperse fine cement particles, creating increased fluidity. Ultra fine pozzolans such as silica fume typically decrease fluidity and increase water demand.

The lime (CaO) content within materials commonly considered to be pozzolanic in nature can vary greatly, as discussed above, from about 0% to about 50% by weight. According to one embodiment, the lime content of the pozzolan will be less than about 35% by weight. In another embodiment, the lime content will be less than about 25%. In yet another embodiment, the lime content will be less than about 15%. In still another embodiment, the lime content of the pozzolan will be less than about 10% by weight. In some cases it may be less than about 5%.

As discussed above, the particle size distribution of the pozzolan fraction with the inventive cements can be similar to that of the larger particle fractions found in OPC (e.g., 10-45 μm). According to one embodiment, at least about 85% of the pozzolan particles will have a particle size greater than about 5 μm (e.g., distributed over a range of about 5-100 μm, or about 5-60 μm), preferably at least about 90%, more preferably at least about 95%, and most preferably at least about 99%. Stated another way, the $D_{15}$, $D_{10}$, $D_5$ or $D_1$ of the pozzolan particles is about 5 μm or greater in this embodiment. Similar restatements apply to the embodiments that follow. In another embodiment, at least about 85% of the pozzolan particles will have a particle size greater than about 7.5 μm (e.g., distributed over a range of about 7.5-100 μm, or about 7.5-60 μm), preferably at least about 90%, more preferably at least about 95%, and most preferably at least about 99%. According to another embodiment, at least about 85% of the pozzolan particles will have a particle size greater than about 10 μm (e.g., distributed over a range of about 10-100 μm, or about 10-60 μm), preferably at least about 90%, more preferably at least about 95%, and most preferably at least about 99%. According to yet another embodiment, at least about 85% of the pozzolan particles will have a particle size greater than about 15 μm (e.g., distributed over a range of about 15-100 μm, or about 15-60 μm), preferably at least about 90%, more preferably at least about 95%, and most preferably at least about 99%. And in another embodiment, at least about 85% of the pozzolan particles will have a particle size greater than about 20 μm (e.g., distributed over a range of about 20-100 μm, or about 20-60 μm), preferably at least about 90%, more preferably at least about 95%, and most preferably at least about 99%.

Of course, it will be appreciated that a purpose of including larger sized pozzolan particles is to reduce water demand. To the extent this can be accomplished using atypical particle size distributions not found in OPC, such particle size distributions, so long as they fall within one or more of the ranges set forth herein, would be within the scope of the invention. Thus, pozzolan particles that are distributed over a narrower range (e.g., over a range of about 20-60 μm, or about 25-50 μm, or about 30-40 μm) may be utilized. Notwithstanding the foregoing, a small percentage of fine pozzolan particles (e.g., about 1-3 μm) may be desirable to help disperse the fine cement particles and increase fluidity. Moreover, all things being equal, particles that are more spherical or uniform reduce water demand, which means that such particles can be smaller on average compared to more jagged particles while providing the same or lower water demand.

Depending on the particle size distribution of the starting pozzolan material, it may be desirable to not only remove at least some of the fine pozzolan particles but also at least some of the coarsest particles. For example, it may be desirable to remove a substantial portion (e.g., at least about 90%) of the particles greater than about 120 μm, 100 μm, 80 μm, 60 μm or 45 μm. Accordingly, it may be desirable for the pozzolan fraction to have a $D_{90}$ less than about 120 μm, preferably less than about 100 μm, more preferably less than about 80 μm, even more preferably less than about 60 μm, and most preferably less than about 45 μm.

D. Supplemental Lime and Other Bases

As discussed above, hydraulic cements such as Portland cement which contain tricalcium silicate will typically provide excess calcium hydroxide that is available for reaction with the pozzolan. Depending on the relative proportion of tricalcium silicate in the hydraulic cement and the relative quantity of hydraulic cement within the pozzolan cement composition, it may be desirable to include supplemental lime (e.g., calcium oxide or calcium hydroxide) in order to provide additional calcium hydroxide for reaction with the pozzolan fraction. The amount of supplemental lime may vary from about 0-30% by weight of the overall pozzolan cement composition depending on the amount of pozzolan and deficit of calcium, or about 2-25%, or about 5-20%.

Supplemental lime can be mixed up front with the pozzolan and hydraulic cement in order to yield a more lime balanced cement composition. Alternatively, some or all of the supplemental lime can be added to a fresh concrete or other cementitious composition that includes pozzolan cement within the scope of the invention. The same is true for other admixtures or fillers.

Other bases, such as magnesium oxide, magnesium hydroxide, alkali metal oxides, and alkali metal hydroxides can be added to accelerate the lime-pozzolan reaction.

III. Obtaining Particle Size Optimized Cement and Pozzolan

Any known method for obtaining hydraulic cement and fly ash having a desired particle size distribution and/or fineness can be used within the scope of the present invention. In general, particle size optimized hydraulic cement can be obtained by grinding and classifying cement clinker so as to have a desired particle size distribution.

FIG. 1 illustrates a system 100 for carrying out the methods described herein. In one embodiment, an initial stream of pozzolan particles (e.g., with particle sizes distributed over a range of about 0.1-100 µm) can be stored in silo 110. An initial stream of hydraulic cement particles (e.g., Portland cement with particle sizes distributed over a range of about 0.1-45 µm) can be stored in silo 112. The initial pozzolan stream is delivered to an air classifier 114 and a top cut at a desired $D_{90}$ (e.g., about 45 µm) is performed. Particles above the top cut (e.g., about 45 µm) can then be ground to yield particles smaller than the top cut in grinder 116 in a closed circuit indicated by arrows 118. Classifier 114 and/or a second classifier (not shown) can be used to dedust the pozzolan to remove at least some of the particles less than a desired $D_{10}$ (e.g., about 10 µm) if the pozzolan source is finer than desired. The modified stream of pozzolan particles between the bottom cut and top cut (e.g., distributed over a range of about 10-45 µm) are then delivered to mixer 120 for mixing.

The initial stream of hydraulic cement from silo 112 is delivered to air classifier 122 and cut at a desired $D_{90}$ (e.g., about 10 µm). The fine cement particles are delivered to mixer 120 and the coarse cement particles are delivered to grinder 124 and ground in a closed circuit as indicated by arrows 126 to achieve a particle size distribution having the desired $D_{90}$ (e.g., about 10 µm). The ground cement particles are also delivered to mixer 120 and mixed to produce the blended pozzolan cement. The classified and ground cement particles comprise a modified stream of hydraulic cement particles. Mixer 120 can be any blending apparatus known in the art or can even be a grinder. In the case where mixer 120 is also a grinder, some reduction in the particle sizes of cement and pozzolan would be expected although the amount of grinding can be selected, or even minimized, to mainly ensure intimate mixing of the cement and pozzolan particles rather than grinding. The pozzolan cement blend from mixer 120 can then be delivered to one or more storage hoppers 128 for later use or distribution.

System 100 can be used to produce cement particles and pozzolan particles within any of the particle size distribution ranges described in this application. In addition, system 100 can include more or fewer grinders and classifiers, conduits, bag houses, analytical instrumentation, and other hardware known in the art. Hydraulic cement and pozzolan particles can be stored and moved in system 100 using any techniques known in the art, including conveyors, pneumatic systems, heavy equipment, etc. The hydraulic cement can be provided as ground cement or as clinker. As such, system 100 can be incorporated into a finish mill as understood in the cement art. In addition, system 100 can use open circuit milling in addition to or as an alternative to closed circuit milling. While system 100 shows the coarsest pozzolan particles being reground, those skilled in the art will recognize that pozzolan is often a waste material and the use of the removed coarse and fine pozzolan fractions is not necessary.

According to one embodiment, hydraulic cement clinker can be ground according to known methods, such as using a rod mill and/or ball mill. Such methods typically yield cement having a wide particle size distribution of about 0.1-100 µm. Thereafter, the ground cement is passed through an air classifier in order to separate the fine particle fraction. The coarse fraction can be returned to the grinder and/or introduced into a dedicated grinder in order to regrind the coarse fraction. The reground cement material is then passed through an air classifier in order to separate the fine particle fraction. The fine fraction from the second classification step can be blended with the fine fraction from the first classification step. This process can be repeated until all the cement has been ground and classified to a desired particle size distribution. Repeatedly classifying the ground cement, regrinding the coarse fraction, and blending together the fine fractions advantageously yields a fine cement material having substantially the same chemistry as the clinker from which it is made. Grinding aids and blending components (e.g., gypsum) known in the art can be added during or after the grinding process.

In an alternative embodiment, finished hydraulic cement such as OPC can be classified in order to separate the fine fraction from the coarse fraction, regrinding the coarse fraction, classifying the reground material, and blending the first and second fine fractions. This process can be repeated until all the cement has been ground and classified to the desired particle size distribution. Repeatedly classifying the ground cement, regrinding the coarse fraction, and blending together the fine fractions advantageously yields a fine cement material having substantially the same chemistry as the original hydraulic cement. By way of example, the first classification step might concentrate gypsum in the fine fraction, as gypsum is often concentrated in the fine particle fraction of OPC. Regrinding the coarse fraction and blending the newly obtained fine fraction(s) with the original fine fraction can restore the original balance of gypsum to calcium silicates and aluminates.

The pozzolan fraction (e.g., fly ash), to the extent it contains an undesirable quantity of very fine and/or very coarse particles, can similarly be classified using an air classifier in order to remove at least a portion of the very fine and/or very coarse particles. Very coarse pozzolan particles (e.g., greater than about 60-120 µm) removed during classification can be ground or otherwise treated (e.g., by other fracturing methods known in the art) so as to fall within the desired particle size distribution. Very fine pozzolan particles (e.g., less than about 10 µm) removed during the classification process can be sold to end users (e.g., grout manufacturers) as is or further ground into an ultra-fine product (e.g., less than about 1 µm) so as to yield a highly reactive pozzolan material that can act as a substitute for relatively expensive pozzolans such as silica fume and metakaolin used to form high strength concretes with decreased pore permeability.

Other methods for obtaining hydraulic cement and pozzolan fractions having a desired particle size distribution and/or fineness can be used, such as mechanical sieves. However, such methods are usually much slower and more expensive than high volume air classification.

As mentioned above, the pozzolan cement blends of the invention can substitute for OPC, including Type I and Type II cements. Type I and Type II cements are commonly terms used to refer to a binder with characteristics defined by ASTM C-150. As those skilled in the art will appreciate, general purpose blended cements that can substitute for ASTM C150 cement should have set times and other performance characteristics that fall within the ranges of ASTM C-150 in order to serve as a substitute for Type I or Type II cement in the ready mix industry. In one embodiment, the blended cement meets the fineness and/or set time requirements of a Type I/II OPC, as defined in ASTM C-150-08 or C-150-00, which are both incorporated herein by reference. In one embodiment, the pozzolan cement blends of the invention have a fineness in a range from about 200 $m^2$/kg to about 650 $m^2$/kg, more preferably about 280 $m^2$/kg to about 600 $m^2$/kg, even more preferably about 300 $m^2$/kg to about 500 $m^2$/kg, and most preferably about 350 $m^2$/kg to about 450 $m^2$/kg.

In a preferred embodiment, the set time of the pozzolan cement composition is within the ASTM C-150 standard for set time, which uses a Vicat test according to C-191, which is also incorporated herein by reference. In one embodiment, the initial set time is in a range from about 30 minutes to about 500 minutes, more preferably about 45 minutes to about 375 minutes, and most preferably about 60 minutes to about 350 minutes.

In one embodiment, the pozzolan cement has an autoclave expansion max % as defined by C-151, which is also hereby incorporated herein by reference, of less than 0.9, more preferably 0.80.

In one embodiment, the pozzolan cement meets the compressive strength test of Type I/II cements according to ASTM C-150, which defines strength according to ASTM C-109, which is hereby incorporated by reference. In one embodiment, the 3-day strength of the pozzolan cement blend is at least about 10 MPa, more preferably at least about 12 MPa. In one embodiment, the 7-day strength of the pozzolan cement blend is at least about 17 MPa, more preferably at least about 19 MPa. In one embodiment, the 28-day strength of the pozzolan cement blend is at least about 28 MPa, more preferably at least about 32 MPa.

As mentioned above, in one embodiment, the pozzolan cement blends have similar performance characteristics of Type I/II cement rather than Type III cement, which is a rapid hardening cement and not generally as beneficial for the ready mix industry. Where type I/II cement is mimicked, the early strength is preferably less than that of type III cement, which will result in better long term strength. In this embodiment, the 1-day strength of the pozzolan cement blend, according to ASTM C109, is preferably less than about 15 MPa, more preferably less than about 12 MPa, and most preferably less than about 10 MPa, and the 3-day strength is preferably less than about 24 MPa, more preferably less than about 22 MPa, and most preferably less than about 19 MPa.

The pozzolan cement blend may have any other features of Type I or Type II cement as set forth in ASTM C-150. In addition, the pozzolan cement blend may have any features set forth in ASTM C-595-08 for blended cements. In one embodiment, the maximum weight percent of pozzolan in the pozzolan cement blend of the invention can be about 40% or less. Limiting the weight percent of pozzolan can minimize the effects of variable chemistry in the most pozzolan sources.

The pozzolan cement blends of the invention may have any of the foregoing characteristics of Type I/II cements in any combination. These ASTM related features can be used in any combination with the particle size distribution ranges described above.

IV. Cementitious Compositions

The inventive pozzolan cement compositions can be used to make concrete, mortar, grout, molding compositions, or other cementitious compositions. In general, "concrete" refers to cementitious compositions that include a hydraulic cement binder and aggregate, such as fine and coarse aggregates (e.g., sand and rock). "Mortar" typically includes cement, sand and lime and can be sufficiently stiff to support the weight of a brick or concrete block. "Grout" is used to fill in spaces, such as cracks or crevices in concrete structures, spaces between structural objects, and spaces between tiles. "Molding compositions" are used to manufacture molded or cast objects, such as pots, troughs, posts, fountains, ornamental stone, and the like.

Water is both a reactant and rheology modifier that permits fresh concrete, mortar or grout to flow or be molded into a desired configuration. The hydraulic cement binder reacts with water, is what binds the other solid components together, and is responsible for strength development. Cementitious compositions within the scope of the present invention will typically include hydraulic cement (e.g., Portland cement), pozzolan (e.g., fly ash), water, and aggregate (e.g., sand and/or rock). Other components that can be added include water and optional admixtures, including but not limited to accelerating agents, retarding agents, plasticizers, water reducers, water binders, and the like.

It will be appreciated that the inventive pozzolan cement compositions can be manufactured (i.e., blended) prior to incorporation into a cementitious composition or they may be prepared in situ. For example, some or all of the hydraulic cement and pozzolan particles can be mixed together when making a cementitious composition. In the case where supplemental lime is desired in order to increase the speed and/or extent of pozzolan hydration, at least some of the supplemental lime or other base may be added to the cementitious composition directly.

In order to accelerate hydration of the pozzolan fraction, it may be desirable to pre-treat at least some of the pozzolan particles with aqueous calcium hydroxide or other basic solutions in order to commence hydration prior to exposing the hydraulic cement particles to water. This may be helpful in closing the time gap of hydration between the more quickly reacting hydraulic cement particles and more slowly reacting pozzolan particles. For example, at least a portion of the pozzolan fraction can be mixed with aqueous calcium hydroxide at least about 30 minutes prior to exposing the hydraulic cement fraction to water. Alternatively, the pozzolan can be mixed with aqueous calcium hydroxide at least about 1 hour, at least about 3 hours, at least about 5 hours, or at least about 8 hours prior to exposing the hydraulic cement to water.

Depending on the relative reactivity of the hydraulic cement and ratio of hydraulic cement to pozzolan, it may be desirable to accelerate or retard hydration. In the case where the hydraulic cement particles (e.g. greater than about 50%) have a very small average particle size (e.g., less than about 5 μm, about 3 μm, or about 1 μm) in order to impart high early strength, it may be desirable to include a hydration stabilizer that can retard setting and prevent flash setting and/or rapid hardening. The use of a hydration stabilizer may permit the use of very small hydraulic cement particles in order to achieve high early strength while preventing uncontrollable or flash setting.

A "hydration stabilizer" (also known as an extended set retarder) can be used to inhibit the hydration of the hydraulic cement. The most commonly used hydration stabilizer is gypsum, which inhibits hydration of tricalcium aluminate and prevents flash setting through formation of ettringite with the tricalcium aluminate. According to one embodiment, it may be desirable to increase or decrease the amount of gypsum based on the quantity of fast reacting tricalcium aluminate and other aluminates in the hydraulic cement and/or pozzolan and/or hydraulic cement/pozzolan mix. Increasing the gypsum retards setting of the aluminates. Decreasing the gypsum accelerates setting of the aluminates. It may be desirable to optimize the quantity of gypsum for different pozzolan cement blends to achieve a desired set time for each blend.

Other types of hydration stabilizers slow the rate of hydrate formation by tying up (i.e., chelating, complexing, or otherwise binding) calcium ions on the surface of the hydraulic cement particles. Examples of hydration stabilizers include polyphosphonic acids or carboxylic acids that contain hydroxyl and/or amino groups.

In some cases, it may desirable to include an accelerator. Accelerators that can be used to activate the hydraulic cement can be selected from conventional cement accelerators such as those classified as ASTM C 494 Type C admixtures. These include alkaline earth metal halides (calcium chloride and the like), alkaline earth metal nitrites (calcium nitrite and the like), alkaline earth metal nitrates (calcium nitrate and the like), alkaline earth metal formates (calcium formate and the like), alkali metal thiocyanates (sodium thiocyanate and the like), triethanolamine and the like. The amount, based on hydraulic cement content (i.e., exclusive of the pozzolan), should be from about 0.5-6% by weight, preferably from about 1-5% by weight.

Water reducers may be particularly useful in order to increase flowability of the cementitious compositions and/or reduce water demand. Conventional, mid-range, and high-range water reducers can be used. Conventional water reducers can be used to achieve a minimum water reduction of 5% and/or an increase in slump of about 1-2 inches. Mid-range water reducers can reduce water demand by 8-15%. High-range water reducers can reduce water demand by 12-40%. Mid-range and high-range water reducers also can be used to slow the setting of concrete in hot weather.

V. Examples

The following examples, when expressed in the past tense, illustrate embodiments of the invention that have actually been prepared. Examples given in the present tense are hypothetical in nature but are nevertheless illustrative of embodiments within the scope of the invention.

Cementitious mortar compositions were prepared according to ASTM C-109 in order to test the strength of mortar cubes made therefrom. The mortar compositions were prepared according to standard procedures established by ASTM C-109, including adding the cement to the water, mixing at slow speed for 30 seconds, adding the sand over a period of 30 seconds while mixing at slow speed, stopping the mixing, scraping the walls, letting the mixture stand for 90 seconds, and then mixing at medium speed for 60 seconds.

The flow of each of the cementitious mortar compositions was tested using a standard flow table, in which a sample of mortar was placed in the middle of the table, the table was subjected to 25 raps, and the diameter of the resulting mass was measured in four directions and added together to give a composite flow value in centimeters.

Thereafter, the mortar was packed into mortar cube molds using standard procedures established by ASTM C-109, including filling the molds half-way, compacting the mortar in the molds using a packing tool, filling the molds to the tops, compacting the mortar using a packing tool, and smoothing off the surface of mortar in the molds.

The mortar cube molds were placed in a standard humidity chamber for 1 day. Thereafter, the mortar cubes were removed from the molds and submerged inside buckets filled with saturated aqueous lime solution. The cubes were thereafter tested for compressive strength using a standard compressive strength press at 3 days, 7 days and 28 days.

Examples 1-4

Examples 1-4 illustrate the effect of particle size optimizing a 70:30 blend of Portland cement and fly ash. The Portland cement used in each of Examples 1-4 was Type II made by grinding Type V cement more finely. Example 1 was a particle size optimized 70:30 cement/pozzolan blend. It employed a classified Portland cement identified as "cement #11", which was obtained by passing Type II Portland cement through a Microsizer Air Classifier manufactured by Progressive Industries, located in Sylacauga, Ala. and collecting the fine fraction. Example 1 also employed classified fly ash identified as "fly ash 8z1", which was obtained by passing Class F fly ash through an air classifier twice, first to remove most of the fines below about 10 μm and second to remove most of the fines above about 50 μm. The air classifier was model CFS 8 HDS of Netzsch-Condux Mahltechnik GmbH, located in Hanau, Germany. Examples 2 and 3 were both 70:30 control blends of Portland cement and fly ash which used unclassified Type II cement ("control cement") and Class F fly ash ("control fly ash"). Example 4 used 100% ordinary Type II Portland cement. The particle size distributions of the Portland cement and fly ash fractions were determined at Netzsch-Condux Mahltechnik GmbH using a Cilas 1064 particle size analyzer and are set forth below in Table 1.

TABLE 1

| Particle Size (μm) | Percent Passing/Cumulative Total (%) | | | |
|---|---|---|---|---|
| | Cement #11 | Control cement | Fly Ash 8z1 | Control fly ash |
| 0.04 | 0.15 | 0.13 | 0.04 | 0.10 |
| 0.10 | 0.84 | 0.81 | 0.09 | 0.51 |
| 0.50 | 5.27 | 5.79 | 0.68 | 3.40 |
| 1.00 | 12.71 | 13.44 | 1.91 | 9.27 |
| 2.00 | 21.97 | 21.21 | 3.36 | 20.74 |
| 3.00 | 28.13 | 24.99 | 3.88 | 28.59 |
| 4.00 | 35.76 | 29.24 | 4.22 | 33.79 |
| 6.00 | 54.90 | 39.23 | 4.69 | 40.87 |
| 8.00 | 73.49 | 48.47 | 4.69 | 46.27 |
| 10.00 | 87.10 | 56.15 | 4.69 | 50.78 |
| 15.00 | 99.13 | 71.34 | 10.04 | 59.32 |
| 20.00 | 100.0 | 83.16 | 24.65 | 65.58 |
| 32.00 | 100.0 | 97.50 | 66.84 | 78.82 |
| 50.00 | 100.0 | 100.0 | 95.53 | 93.78 |
| 71.00 | 100.0 | 100.0 | 100.0 | 99.40 |
| 100.0 | 100.0 | 100.0 | 100.0 | 100.0 |

The compositions used in making mortar cubes according to Examples 1-4 and also the flow and strength results are set forth below in Table 2. The amount of fly ash added to the 70:30 blends was reduced to account for its reduced density compared to the Portland cement in order to maintain 30% volumetric replacement.

TABLE 2

| Component/strength | Example 1 | Example 2 | Example 3 | Example 4 |
|---|---|---|---|---|
| Cement #11 | 518 g | — | — | — |
| Fly Ash 8z1 | 162.1 g | — | — | — |
| Control OPC | — | 518 g | 518 g | 740 g |
| Control FA | — | 162.1 g | 162.1 g | — |
| Graded Sand | 2035 g | 2035 g | 2035 g | 2035 g |
| Water | 360 g | 360 g | 330 g | 360 g |
| Flow | 106 | 136+* | 109.5 | 118 |
| 3-day strength | 26.6 MPa | 16.0 MPa | 15.8 MPa | 28.6 MPa |
| 7-day strength | 26.8 MPa | 21.2 MPa | 18.2 MPa | 32.4 MPa |
| 28-day strength | 40.9 MPa | 32.0 MPa | 35.4 MPa | 45.6 MPa |

*Only 21 taps on flow table

Figure 2:
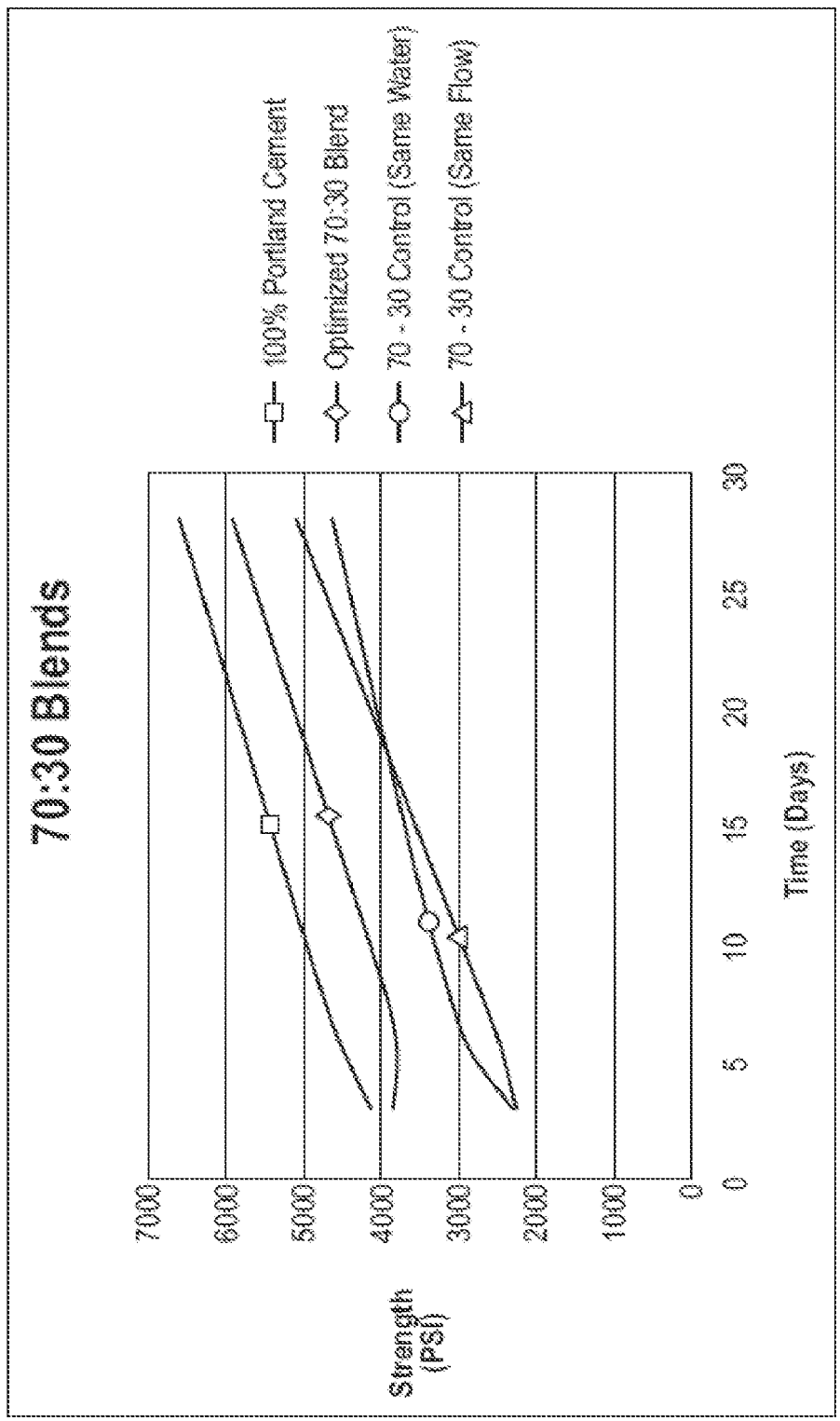
FIG. 2 is a graph comparing a pozzolan cement blend with control blends and 100% Portland cement.

As can be seen from the data in Table 2, the inventive 70:30 blend of Example 1 had 93% of the strength of the 100% OPC composition of Example 4 at 3 days, 83% of the strength at 7 days, and 90% of the strength at 28 days. By comparison, the 70:30 control blends of Examples 2 and 3 only had 56% and 55%, respectively, of the strength of the 100% OPC composition of Example 4 at 3 days, 65% and 56%, respectively, of the strength at 7 days, and 70% and 78% of the strength at 28 days. Particle size optimizing the Portland cement and fly ash fractions yielded substantially greater strength development compared to the control blends at 3, 7 and 28 days. The increase in strength was particularly pronounced at 3 days. FIG. 2 graphically illustrates and compares the strengths obtained using the compositions of Examples 1-4

Examples 5-14

Other mortar compositions (i.e., 60:40 and 70:30 blends) were manufactured using cement #11 and fly ash 8z1. In addition, mortar compositions were manufactured using another classified cement material identified as "cement #13" and another classified fly ash identified as "fly ash 7G". Cement #13 was classified at the same facility as cement #11. The particle size distributions of cement #11, cement #13 and the control cement were determined at the classifying facility using a Beckman Coulter LS 13 320 X-ray diffraction analyzer and are set forth below in Table 3.

TABLE 3

| Particle Size | Percent Passing/Cumulative Total (%) | | |
|---|---|---|---|
| (μm) | Cement #11 | Cement #13 | Control cement |
| 0.412 | 0.26 | 0.33 | 0.14 |
| 0.545 | 2.33 | 2.96 | 1.24 |
| 0.721 | 6.42 | 8.21 | 3.43 |
| 0.954 | 11.9 | 15.3 | 6.37 |
| 1.261 | 18.1 | 23.5 | 9.66 |
| 1.669 | 24.7 | 32.5 | 13.0 |
| 2.208 | 32.1 | 42.1 | 16.6 |
| 2.920 | 40.9 | 52.7 | 20.5 |
| 3.863 | 51.6 | 64.2 | 25.3 |
| 5.111 | 64.1 | 76.1 | 31.5 |
| 6.761 | 77.4 | 87.3 | 39.4 |
| 8.944 | 89.6 | 96.0 | 49.0 |
| 11.83 | 97.9 | 99.8 | 60.3 |
| 15.65 | 99.97 | 100 | 73.0 |
| 20.71 | 100 | 100 | 85.6 |
| 24.95 | 100 | 100 | 92.4 |
| 30.07 | 100 | 100 | 96.7 |
| 36.24 | 100 | 100 | 98.9 |
| 43.67 | 100 | 100 | 99.8 |
| 52.63 | 100 | 100 | 99.995 |

Fly ash 7xG was classified at the same facility as fly ash 8z1 (Netzsch-Condux Mahltechnik GmbH) but was only classified once to remove fine particles. It was not classified a second time to remove coarse particles. The particle size distribution of fly ash 7G was determined using a Cilas 1064 particle size analyzer and is set forth below in Table 4. The PSD of the control fly ash is included for comparison

TABLE 4

| Particle Size (μm) | Percent Passing/Cumulative Total (%) | |
|---|---|---|
| | Fly Ash 7G | Control fly ash |
| 0.04 | 0.00 | 0.10 |
| 0.10 | 0.00 | 0.51 |
| 0.50 | 0.51 | 3.40 |
| 1.00 | 1.34 | 9.27 |
| 2.00 | 2.24 | 20.74 |
| 3.00 | 2.60 | 28.59 |
| 4.00 | 2.80 | 33.79 |
| 6.00 | 2.99 | 40.87 |
| 8.00 | 2.99 | 46.27 |
| 10.00 | 2.99 | 50.78 |
| 15.00 | 5.26 | 59.32 |
| 20.00 | 10.94 | 65.58 |
| 32.00 | 29.26 | 78.82 |
| 50.00 | 54.79 | 93.78 |
| 71.00 | 76.18 | 99.40 |
| 100.0 | 92.01 | 100.0 |
| 150.0 | 99.46 | 100.0 |

The compositions used in making mortar cubes according to Examples 5-14 and also the flow and strength results are set forth below in Tables 5 and 6. The amount of fly ash added to some of the blends was reduced to account for its reduced density compared to the Portland cement in order to maintain a 30% or 40% volumetric replacement. In other cases, the replacement was 30% or 40% by weight. In one example, lye was added; in another, slaked lime.

TABLE 5

| Component/strength | Example 5 | Example 6 | Example 7 | Example 8 | Example 9 |
|---|---|---|---|---|---|
| Cement #11 | 444 g | 518 g | 444 g | 444 g | 444 g |
| Cement #13 | — | — | — | — | — |
| Fly Ash 8z1 | — | — | 216.1 g | — | — |
| Fly Ash 7G | 296 g | 222 g | — | 216.1 g | — |
| Control FA | — | — | — | — | 216.1 g |
| Graded Sand | 2035 g | 2035 g | 2035 g | 2035 g | 2035 g |
| Water | 390 g | 370 g | 360 g | 360 g | 360 g |
| Flow | 109 | 95 | 122 | 110 | 107.5 |
| 3-day | 19.1 MPa | 26.1 MPa | 19.4 MPa | 16.7 MPa | 20.7 MPa |
| 7-day | 21.5 MPa | 33.0 MPa | 26.7 MPa | 25.3 MPa | 21.8 MPa |
| 28-day | 28.2 MPa | 35.5 MPa | 28.2 MPa | 30.3 MPa | 25.9 MPa |

TABLE 6

| Component/strength | Example 10 | Example 11 | Example 12 | Example 13 | Example 14 |
|---|---|---|---|---|---|
| Cement #11 | 444 g | — | 518 g | 444 g | 444 g |
| Cement #13 | — | 444 g | — | — | — |
| Fly Ash 8z1 | 216.1 g | 216.1 g | 162 g | — | — |
| Fly Ash 7G | — | — | — | 216.1 g | 216.1 g |
| Type S Lime | — | — | — | — | 20 g |
| NaOH | — | — | — | 3.3 g | — |
| Graded Sand | 2035 g | 2035 g | 2035 g | 2035 g | 2035 g |
| Water | 350 g | 360 g | 360 g | 360 g | 360 g |
| Flow | 106.5 | 110.5 | 86.5 | 89 | 98 |
| 3-day | 19.7 MPa | 18.7 MPa | 19.9 MPa | 17.9 MPa | 17.9 MPa |
| 7-day | 20.9 MPa | 21.9 MPa | 25.9 MPa | 19.1 MPa | 17.6 MPa |
| 28-day | 27.6 MPa | 30.6 MPa | 28.6 MPa | 23.7 MPa | 28.6 MPa |

The following examples are hypothetical examples based on the principals disclosed herein.

Example 15

A high early strength pozzolan cement is manufactured by combining the following components in the amounts specified:

| Component | Amount by Weight | Particle Size Range |
|---|---|---|
| Portland cement | 45% | 0.1-20 μm |
| Pozzolan | 50% | 20-100 μm |
| Calcium hydroxide | 5% | 1-10 μm |

The foregoing composition has early strength that is comparable to OPC and a strength and durability after 1 year that equals or exceeds that of OPC.

Example 16

A high early strength pozzolan cement is manufactured by combining the following components in the amounts specified:

| Component | Amount by Weight | Particle Size Range |
|---|---|---|
| Portland cement | 40% | 0.1-15 μm |
| Pozzolan | 53% | 15-100 μm |
| Calcium hydroxide | 7% | 1-10 μm |

The foregoing composition has early strength that is comparable to OPC and a strength and durability after 1 year that equals or exceeds that of OPC.

Example 17

A high early strength pozzolan cement is manufactured by combining the following components in the amounts specified:

| Component | Amount by Weight | Particle Size Range |
|---|---|---|
| Portland cement | 30% | 0.1-10 μm |
| Pozzolan | 60% | 10-100 μm |
| Calcium hydroxide | 10% | 1-10 μm |

The foregoing composition has early strength that is comparable to OPC and a strength and durability after 1 year that equals or exceeds that of OPC.

Example 18

A high early strength pozzolan cement is manufactured by combining the following components in the amounts specified:

| Component | Amount by Weight | Particle Size Range |
|---|---|---|
| Portland cement | 20% | 0.1-5 μm |
| Pozzolan | 65% | 10-100 μm |
| Calcium hydroxide | 15% | 1-10 μm |

The foregoing composition has early strength that is comparable to OPC and a strength and durability after 1 year that equals or exceeds that of OPC.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A blended cement composition comprising:
    a hydraulic cement fraction comprised of differently sized hydraulic cement particles, wherein the hydraulic cement fraction, when mixed with water, provides excess calcium hydroxide that is available for reaction with a pozzolan, the hydraulic cement fraction having a Blaine fineness greater than about 500 m²/kg, the hydraulic cement fraction comprising Portland cement and ground granulated blast-furnace slag; and
    a pozzolan fraction comprised of differently sized pozzolan particles selected from the group consisting of fly ash, ground slag, and/or natural pozzolan that reacts with calcium hydroxide in the presence of water, including calcium hydroxide provided by the hydraulic cement fraction when mixed with water, in order to form solid hydration products having cementitious properties, the pozzolan fraction having a Blaine fineness that is less than the Blaine fineness of the hydraulic cement fraction.

2. A blended cement composition as in claim 1, wherein the Blaine fineness of the hydraulic cement fraction is at least about 1.5 times greater than the Blaine fineness of the pozzolan fraction.

3. A blended cement composition as in claim 1, wherein the Blaine fineness of the hydraulic cement fraction is at least about 2 times greater than the Blaine fineness of the pozzolan fraction.

4. A blended cement composition as in claim 1, wherein the Blaine fineness of the hydraulic cement fraction is greater than about 650 m²/kg.

5. A blended cement composition as in claim 1, wherein the Blaine fineness of the pozzolan fraction is less than about 325 m²/kg.

6. A blended cement composition as in claim 1, wherein the hydraulic cement fraction has a $D_{85}$ less than about 20 μm.

7. A blended cement composition as in claim 1, wherein the hydraulic cement fraction has a $D_{90}$ less than about 20 μm.

8. A blended cement composition as in claim 1, wherein the pozzolan fraction has a $D_{10}$ greater than about 10 μm.

9. A blended cement composition as in claim 1, wherein the pozzolan fraction has a $D_{10}$ greater than about 15 μm.

10. A blended cement composition as in claim 1, wherein the hydraulic cement fraction and pozzolan fraction form a dry blend of particles with no added water.

11. A blended cement composition comprising:
    a hydraulic cement fraction comprised of differently sized hydraulic cement particles having a $D_{85}$ less than about 20 μm and a first specific surface area, wherein the hydraulic cement fraction, when mixed with water, provides excess calcium hydroxide that is available for reaction with a pozzolan, the hydraulic cement fraction comprising Portland cement and ground granulated blast-furnace slag; and
    a pozzolan fraction comprised of differently sized pozzolan particles selected from the group consisting of fly ash, ground slag and natural pozzolan, the pozzolan fraction having a $D_{10}$ greater than about 15 μm and being that reacts with calcium hydroxide in the presence of water, including calcium hydroxide provided by the hydraulic cement fraction when mixed with water, in order to form solid hydration products having cementitious properties, the pozzolan fraction having a second specific surface area that is less than the first specific surface area of the hydraulic cement fraction.

12. A blended cement composition as in claim 11, wherein the hydraulic cement fraction has a Blaine fineness greater than about 500 m²/kg and wherein the Blaine fineness of the Portland cement fraction is about 1.25 times to about 50 times greater than a Blaine fineness of the pozzolan fraction.

13. A blended cement composition as in claim 11, wherein the Blaine fineness of the Portland cement fraction is greater than about 650 m²/kg and wherein the Blaine fineness of the Portland cement fraction is about 1.5 times to about 30 times greater than a Blaine fineness of the pozzolan fraction.

14. A blended cement composition as in claim 11, further comprising water, fine aggregate, coarse aggregate and at least one of inert filler, lime, lye, water reducing admixture, accelerant, retardant, hydration stabilizer, or rheology-modifying agent so as to form fresh concrete.

15. A method of manufacturing a blended cement composition according to claim 11, comprising:
    obtaining Portland cement particles having a $D_{85}$ less than about 20 μm;
    obtaining ground granulated blast-furnace slag particles having a $D_{85}$ less than about 20 μm;
    obtaining a pozzolan fraction comprised of differently sized pozzolan particles selected from fly ash, ground slag and/or natural pozzolan, the pozzolan fraction having a $D_{10}$ greater than about 15 μm and a fineness that is less than a fineness of combined Portland cement particles and ground granulated blast-furnace slag particles; and
    combining the hydraulic cement fraction and the pozzolan fraction to yield the blended cement composition.

16. A method as in claim 15, wherein the Portland cement particles and/or the granulated blast-furnace slag particles have a $D_{90}$ less than about 20 μm.

17. A method as in claim 15, wherein the Portland cement particles and/or the granulated blast-furnace slag particles have a $D_{90}$ less than about 15 μm.

18. A blended cement composition as in claim 1, wherein the pozzolan fraction has a $D_{10}$ greater than about 20 μm.

19. A blended cement composition as in claim 11, wherein the pozzolan fraction has a $D_{10}$ greater than about 20 μm.

20. A blended cement composition comprising:
    a hydraulic cement fraction comprised of differently sized hydraulic cement particles having a $D_{85}$ less than about 20 μm and a first specific surface area, wherein the hydraulic cement fraction, when mixed with water, provides excess calcium hydroxide that is available for reaction with a pozzolan, the hydraulic cement fraction comprising Portland cement and a cementitious pozzolan comprising calcium oxide and silica; and
    a pozzolan fraction comprised of differently sized pozzolan particles selected from the group consisting of fly ash, ground slag and natural pozzolan, the pozzolan fraction having a $D_{10}$ greater than about 15 μm and that reacts with calcium hydroxide in the presence of water, including calcium hydroxide provided by the hydraulic cement fraction when mixed with water, in order to form solid hydration products having cementitious properties, the pozzolan fraction having a second specific surface area that is less than the first specific surface area of the hydraulic cement fraction.

* * * * *